Patented Mar. 18, 1952

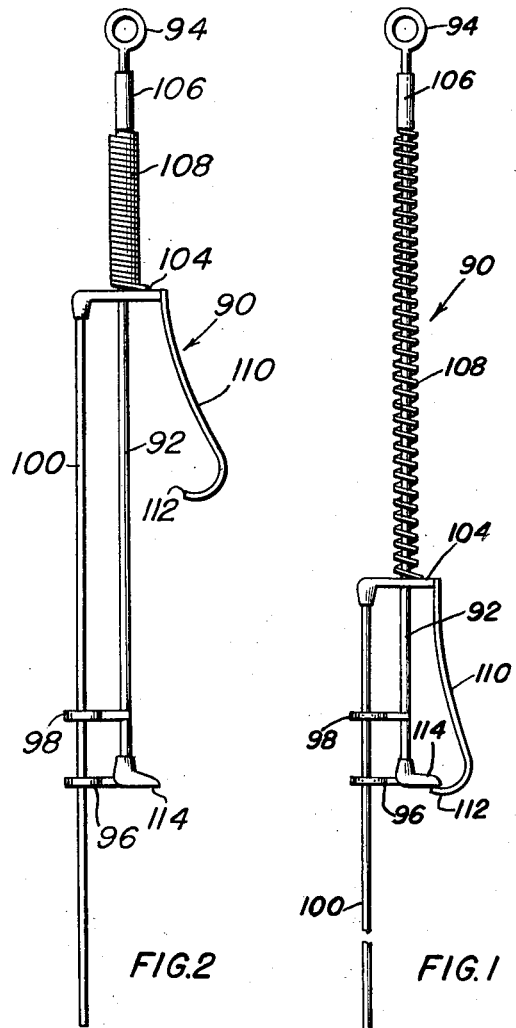

2,589,533

UNITED STATES PATENT OFFICE 2,589,533

PULL ACTUATED TRAP HOOK

Guy M. Buchner, Holdenville, Okla.

Application February 10, 1950, Serial No. 143,561

1 Claim. (Cl. 43—15)

This invention relates to new and useful improvements and structural refinements in fishing tackle, particularly fish hooks, and the principal object of the invention is to assure firm embedding of the hook element in the mouth of a fish so as to prevent the latter from escaping.

This object is achieved by the provision of what may be generally referred to as a trap hook, the same including a spring controlled hook element which is retained in a "set" position by a keeper, but which is violently pulled or jerked by the associated spring as soon as the keeper is released in response to a pulling or tugging action on the hook element by a fish.

Some of the advantages of the invention reside in its simplicity of construction, in its efficiency and dependable operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a side elevational view of the invention, showing the same in its set position; and Figure 2 is a side elevational view thereof but in its sprung position.

Like characters of reference are employed to designate like parts in the specification and throughout the several views.

Referring now to the accompanying drawings in detail, the trap hook is designated generally by the reference character 90, and consists of a rod 92 provided at its upper end with an eye 94 for attachment to a fishing line while the lower end portion of the rod 92 carries a pair of laterally projecting eyes or guides 96, 98 to slidably receive a second rod 100. The lower end of the latter is connected to a suitable, depending hook element 102, while the upper end of the rod carries a laterally projecting eye or guide 104 which is slidable on the rod 92.

A collar 106 is secured to the rod 92 adjacent eye 94 and has connected thereto the upper end of a tension spring 108 which is disposed on the rod 92 and has its lower end anchored to the guide 104, substantially as shown.

In this manner the rod 100 is urged upwardly relative to the rod 92 by the spring 108, and a resilient keeper strip 110 is secured to the guide 104 and terminates at its free end in a laterally arcuated portion or detent 112 which is engageable with a lateral projection 114 on the guide 96 at the lower end of the rod 92.

When the portion 112 of the keeper strip 110 engages the projection or seat 114, the rod 100 cannot be slid upwardly on the rod 92 by the spring 108, but as soon as the rod 100 is pulled or jerked downwardly to a slight extent by the fish hook, disengagement of the keeper strip portion 112 from the projection 114 is facilitated, thus permitting the spring 108 to slide the rod 100 upwardly on the rod 92.

It is believed that the advantages and use of the invention will be clearly apparent from the foregoing disclosure and accordingly, further description at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a trap hook, the combination of a first rod adapted at its upper end for attachment to a fishing line, a laterally projecting guide provided at the lower end of said first rod and having an undersurface formed with a depressed seat, a second rod slidable vertically through said guide and carrying a depending hook element, a laterally projecting guide provided at the upper end of the second rod and slidably engaging the first rod, a collar secured adjacent the upper end of the first rod, a tension spring positioned on the first rod and having its upper end anchored to said collar, the lower end of said spring being secured to the guide on said second rod for sliding the latter upwardly, and a resilient keeper bar secured at its upper end to the guide on the second rod, the lower end of said bar being engageable with said seat for locking the second rod in a downwardly slid position against the resiliency of said spring.

GUY M. BUCHNER.

REFERENCES CITED

The following references are of record in the file of this patent:

UNITED STATES PATENTS

| Number | Name | Date |
|---|---|---|
| 623,290 | Schlaebitz | Apr. 18, 1899 |
| 733,118 | Armstrong | July 7, 1903 |
| 1,334,702 | Juras | Mar. 23, 1920 |
| 2,200,651 | Welch | May 14, 1940 |
| 2,534,795 | Ramsey | Dec. 19, 1950 |